(12) United States Patent
Eswara et al.

(10) Patent No.: US 11,983,913 B2
(45) Date of Patent: May 14, 2024

(54) VIDEO SURVEILLANCE SYSTEM WITH CROWD SIZE ESTIMATION

(71) Applicant: HONEYWELL INTERNATIONAL INC., Charlotte, NC (US)

(72) Inventors: Lalitha M. Eswara, Charlotte, NC (US); Ayan Maiti, Charlotte, NC (US); Ismaiel Shaik, Charlotte, NC (US); Siddharth Sonkamble, Charlotte, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 11 days.

(21) Appl. No.: 17/662,556

(22) Filed: May 9, 2022

(65) Prior Publication Data

US 2022/0366665 A1 Nov. 17, 2022

(30) Foreign Application Priority Data

May 14, 2021 (IN) .............................. 202111021808

(51) Int. Cl.
*G06V 10/25* (2022.01)
*G06T 7/11* (2017.01)
(Continued)

(52) U.S. Cl.
CPC ............... *G06V 10/25* (2022.01); *G06T 7/11* (2017.01); *G06T 7/62* (2017.01); *G06V 20/53* (2022.01); *G06T 2207/10016* (2013.01)

(58) Field of Classification Search
None
See application file for complete search history.

(56) References Cited

U.S. PATENT DOCUMENTS

2010/0027875 A1* 2/2010 Hampapur ........... G06V 40/103
382/159
2020/0387713 A1* 12/2020 Kanthan .................. G06N 3/08

FOREIGN PATENT DOCUMENTS

CN 103577875 A 2/2014
CN 103679149 B 11/2016
(Continued)

OTHER PUBLICATIONS

Topkaya Ibrahim Saygin et al., "Counting people by clustering person detector outputs," 2014 11th IEEE International Conference on Advanced Video and Signal Based Surveillance (AVSS), IEEE, Aug. 26, 2014, pp. 313-318, XP032656436, DOI: 10.1109/AVSS. 2014.6918687 [retrieved on Oct. 8, 2014] (6 pgs).

(Continued)

*Primary Examiner* — Daniel T Tekle
(74) *Attorney, Agent, or Firm* — Seager, Tufte & Wickhem, LLP (57) ABSTRACT

A method for estimating a number of people currently in a region of interest include analyzing a video stream to detect each of a plurality of people within the region of interest as One or more neighbor pairs are identified from among a plurality of possible pairs of the plurality of people within the region of interest. The detected plurality of people may be clustered into one or more clusters based at least in part on the identified one or more neighboring pairs. An estimated number of people in each of the one or more clusters is determined and a representation of the estimated number of people in each of one or more of the clusters is displayed on a display.

20 Claims, 8 Drawing Sheets

(51) Int. Cl.
*G06T 7/62* (2017.01)
*G06V 20/52* (2022.01)

(56) References Cited

FOREIGN PATENT DOCUMENTS

| | | |
|---|---|---|
| CN | 111709285 A | 9/2020 |
| WO | 201604377 A1 | 4/2016 |

OTHER PUBLICATIONS

Al-Zaydi Zeyad Q.H., et al., "An adaptive people counting system with dynamic features selection and occlusion handling," Journal of Visual Communication and Image Representation, Academic Press, Inc., US, vol. 39, Jun. 3, 2016, pp. 218-225, XP029623973, ISSN: 1047-3203, DOI: 10.1016/J. JVCIR. 2016.05.018 (8 pgs).
Sun Yixuan et al., "Counting Crowds with Perspective Distortion Correction via Adaptive Learning," Sensors, vol. 20, No. 13, Jul. 6, 2020, pp. 1-17, XP055965491, DOI: 10.3390/s20133781, retrieved from the internet: URL:https://pdfs.semanticscholar.org/ce9f/018db7cf7639cf6a0ff2300429ba88c1fd5a.pdf (17 pgs).
Guangshuai Gao, et al., "CNN-based Density Estimation and Crowd Counting: A Survey," Arxiv.org, Cornell University Library, 201 Olin Library Cornell University Ithaca, NY 14853, Mar. 28, 2020, XP081632724 (25 pgs).
Extended European Search Report, European Patent Office, EP Application No. 22169677.6, dated Oct. 10, 2022 (15 pgs).
Xu et al., "Depth Information Guided Crowd Counting for Complex Crowd Scenes", pp. 1-9, Elsevier, Apr. 23, 2018.

\* cited by examiner

Case 1: Example of computed relationships

Case 2: Maximum relationships

For n persons, Maximum number of relationships possible = $n*(n-1)/2$

VIDEO SURVEILLANCE SYSTEM WITH CROWD SIZE ESTIMATION

CROSS-REFERENCE TO RELATED APPLICATIONS

This application claims priority pursuant to 35 U.S.C. 119(a) to India Patent Application No. 202111021808, filed May 14, 2021, which application is incorporated herein by reference in its entirety.

TECHNICAL FIELD

The present disclosure relates generally to video surveillance systems. More particularly, the present disclosure relates to video surveillance systems that enable crowd size estimation using a person detection algorithm.

BACKGROUND

A number of video surveillance systems employ video cameras that are installed or otherwise arranged around a surveillance area such as a city, a portion of a city, a facility or a building. Video surveillance systems may also include mobile video cameras, such as drones carrying video cameras. Video surveillance systems may employ person detection algorithms for detecting the presence of people within the video streams provided by the video cameras. What would be desirable are improved methods for estimating crowd size in a surveillance area using video streams from one or more video cameras.

SUMMARY

The present disclosure relates to video surveillance systems, and more particularly method and systems for estimating crowd size in a surveillance area. In an example, a method using a computing device having one or more processors to estimate a number of people that are currently in a region of interest is provided. The region of interest is covered by a video camera having a field of view (FOV) that captures the region of interest. The illustrative method includes receiving a video stream from the video camera and analyzing the video stream to detect each of a plurality of people within the region of interest as well as a measure of size consumed by each of the detected plurality of people in the FOV of the video stream. One or more neighbor pairs are identified from among a plurality of possible pairs of the plurality of people within the region of interest. In some cases, identifying the one or more neighboring pairs includes, for each of the plurality of possible pairs of the plurality of people within the region of interest, comparing the measure of size consumed by each of the corresponding pair of people in the FOV of the video stream, and identifying the corresponding pair of people as possible neighboring pairs when the measure of size consumed by each of the corresponding pair of people in the FOV of the video stream does not differ by more than a predetermined or specified amount.

In some cases, identifying the one or more neighboring pairs of people also includes, for each of the possible neighboring pairs of people, determining a measure of distance in the FOV of the video stream between the corresponding pair of people, and identifying the corresponding pair of people as one of the one or more neighboring pairs of people when the measure of distance between the corresponding pair of people in the FOV of the video stream is less than a threshold distance, wherein the threshold distance is dependent on the measure of size consumed in the FOV of the video stream by at least one of the corresponding pair of people. The identified one or more neighbor pairs are then clustered into one or more clusters. An estimated number of people in each of the one or more clusters is determined, where in some cases, the estimated number of people in each of the one or more clusters is based at least in part on a quantity of the identified one or more neighboring pairs that are associated with the corresponding cluster. A representation of the estimated number of people in each of one or more of the clusters is then displayed on a display.

In another example, a method using a computing device having one or more processors to estimate a number of people that are currently in a region of interest is provided. The region of interest is covered by a video camera having a field of view (FOV) that captures the region of interest. The illustrative method includes receiving a video stream from the video camera and analyzing the video stream to detect each of a plurality of objects within the region of interest as well as a measure of size consumed by each of the detected plurality of objects in the FOV of the video stream. One or more neighbor pairs of objects are identified from among a plurality of possible pairs of the plurality of objects within the region of interest. The detected plurality of objects are clustered into one or more clusters based at least in part on the identified one or more neighboring pairs. An estimated number of objects in each of the one or more clusters is estimated, where in some cases, the estimated number of objects in each of the one or more clusters is based at least in part on a quantity of the identified one or more neighboring pairs that are associated with the corresponding cluster. A representation of the estimated number of objects in each of one or more of the clusters is displayed on a display.

In another example, a method using a computing device having one or more processors to estimate a number of people that are currently in a region of interest is provided. The illustrative method includes receiving a video stream from a video camera and analyzing the video stream to find two or more persons within the region of interest. A determination is made as to whether two of the two or more persons potentially qualify as neighbors based at least in part on a height in the FOV between the two persons. The illustrative method further includes, for those persons who potentially qualify as neighbors based at least in part on the height in the FOV between the two persons, determining a distance in the FOV between the two persons and an adaptive distance threshold relative to the two persons, where in some cases the adaptive distance threshold is based at least in part on the height in the FOV of at least one of the two persons. When the distance is less than the adaptive distance threshold relative to the two persons, a neighbor pair status is assigned to each of the two persons. When the distance is greater than the adaptive distance threshold relative to the two persons, a neighbor pair status is not assigned to each of the two persons. The two or more persons found within the region of interest are clustered into one or more clusters based at least in part on the assigned neighbor pair status of the two or more persons found within the region of interest.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DETAILED DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

Figure 1:
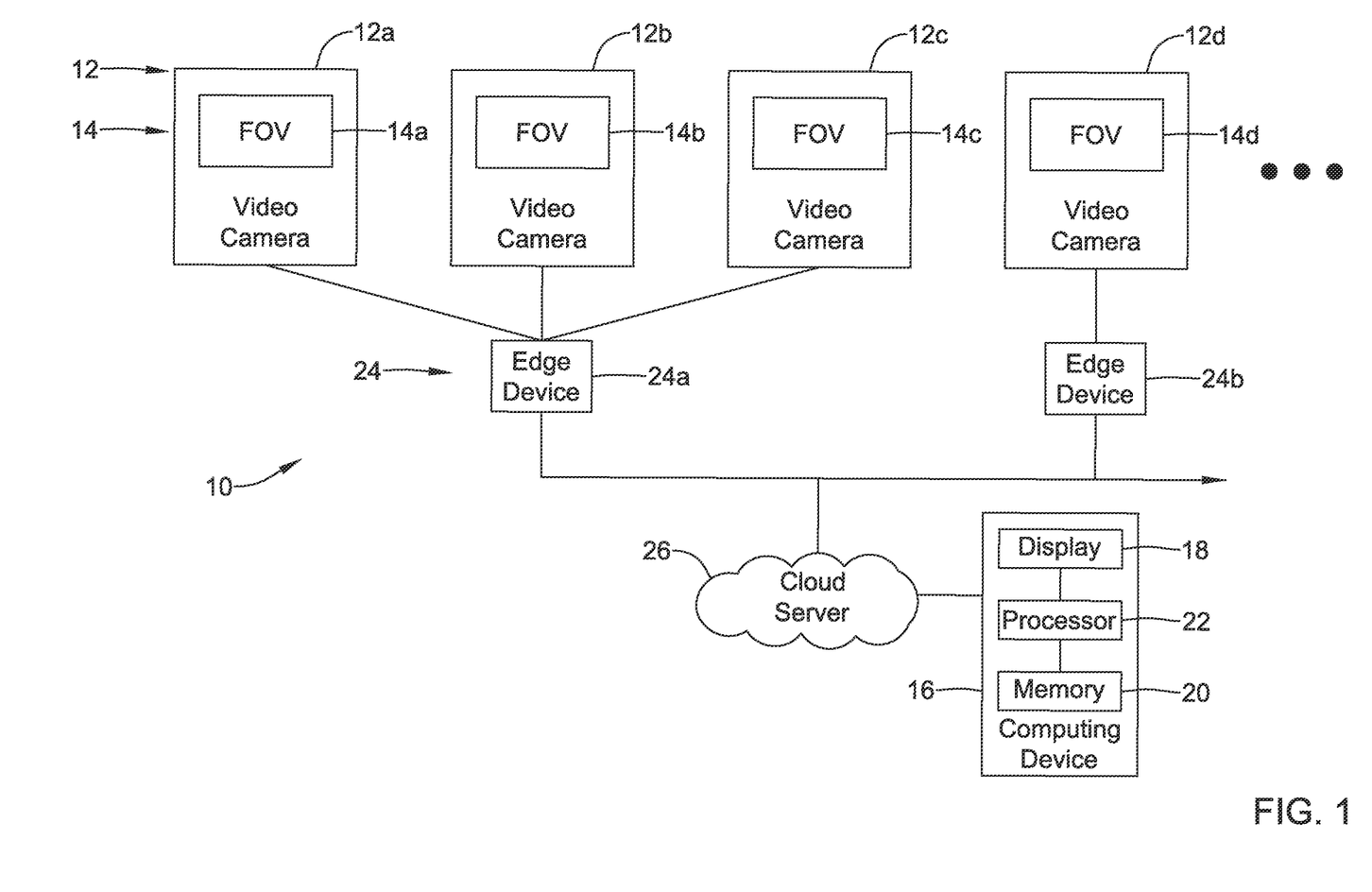
FIG. 1 is a schematic block diagram of an illustrative video surveillance system.

FIG. 1 is a schematic block diagram of an illustrative surveillance system 10 that is configured to provide surveillance of a surveillance area, sometimes referred to as a region of interest. The illustrative surveillance system 10 includes a number of video cameras 12 (e.g. one or more) that are disposed within or otherwise cover at least part of the region of interest. In the example shown, the video cameras are individually labeled as 12a, 12b, 12c, 12d. While a total of four video cameras 12 are illustrated, it will be appreciated that the surveillance system 10 may include one video camera, or hundreds or even thousands of video cameras 12 that are disposed about a smart city, for example. At least some of the video cameras 12 may be fixed video cameras (sometimes with Pan, Tilt and/or Zoom capabilities), meaning that they are each installed at a fixed location. At least some of the video cameras 12 may be mobile video cameras that are configured to move about within the surveillance area. For example, at least some of the video cameras 12 may be mounted within drones that are configured to fly around within the surveillance area, thereby providing video cameras at various locations and/or vertical positions within the surveillance area. In some cases, the mobile video cameras may be dash cameras of emergency vehicles, body cameras of emergency personnel such as police, and/or portable or wearable devices carried by citizens. These are just examples.

Each of the video cameras 12 includes a field of view (FOV) 14. The FOVs 14 are individually labeled as 14a, 14b, 14c, 14d. Some of the video cameras 12 may have a fixed FOV 14 that is dictated by where and how the cameras are installed, the lens installed on the camera, and so on. Some of the video cameras may have, for example, a 120 degree FOV or a 360 degree FOV. Some of the video cameras 12 may have a FOV 14 that is adjustable. For example, some of the video cameras 12 may be Pan, Tilt and Zoom (PTZ) cameras that can adjust their FOV by adjusting one or more of the Pan, the Tilt and/or the Zoom of the particular video cameras 12.

The illustrative surveillance system 10 includes a computing device 16 that is configured to control at least some aspects of operation of the surveillance system 10. For example, the computing device 16 may be configured to provide instructions to at least some of the video cameras 12 to transmit video, for example, or to change one or more of the Pan, the Tilt and the Zoom of video cameras 12 that are PTZ cameras. The computing device 16 may be configured to control operation of one or more mobile video cameras that are part of the surveillance system 10. The computing device 16 includes a display 18, a memory 20 and a processor 22 that is operably coupled with the display 18 and with the memory 20. While a single processor 22 is shown, it will be appreciated that the computing device 16 may include two or more distinct processors, for example. In some cases, the computing device 16 may be an operator console or the like.

In some cases, the video cameras 12 may communicate directly with the computing device 16. In some cases, as illustrated, the video cameras 12 may instead communicate directly with one or more edge devices 24. Two edge devices 24 are shown, individually labeled as 24a and 24b. It will be appreciated that there may be a substantially greater number of edge devices 24, for example. As shown, the video cameras 12*a*, 12*b*, 12*c* are operably coupled with the edge device 24*a* and the video camera 12*d* (and possibly others) are operably coupled with the edge device 24*b*. In some cases, the edge devices 24 may provide some of the functionality that might otherwise be provided by the computing device 16 and/or a cloud-based server 26. When provided, the cloud-based server 26 may be configured to send and receive information between the edge devices 24 and the computing device 16, and in some cases provide processing capabilities to support the methods described herein.

In some cases, each edge device 24 may be an edge controller. In some cases, each edge device 24 may be configured to control operation of each of the video cameras 12 that are operably coupled with that particular edge device 24. A particular edge device 24 may be programmed with or otherwise learn details pertaining to the particular video cameras 12 that are operably coupled with that particular edge device 24. The cloud-based server 26, the computing device 16 and/or one or more of the edge devices 24 may be configured to control at least some aspects of operation of the surveillance system 11, such as providing instructions to at least some of the video cameras 12 to transmit video, for example, or to change one or more of the Pan, the Tilt and the Zoom of video cameras 12 that are PTZ cameras. The cloud-based server 26, the computing device 16 and/or one or more of the edge devices 24 may be configured to control operation of one or more mobile video cameras that are part of the surveillance system 10. The cloud-based server 26, the computing device 16 and/or one or more of the edge devices 24 may be configured to carry out a number of different methods. FIGS. 2 through 5 are flow diagrams showing illustrative methods that may be orchestrated by the cloud-based server 26, the computing device 16 and/or one or more of the edge devices 24 and thus carried out by the surveillance system 10.

Figure 2:
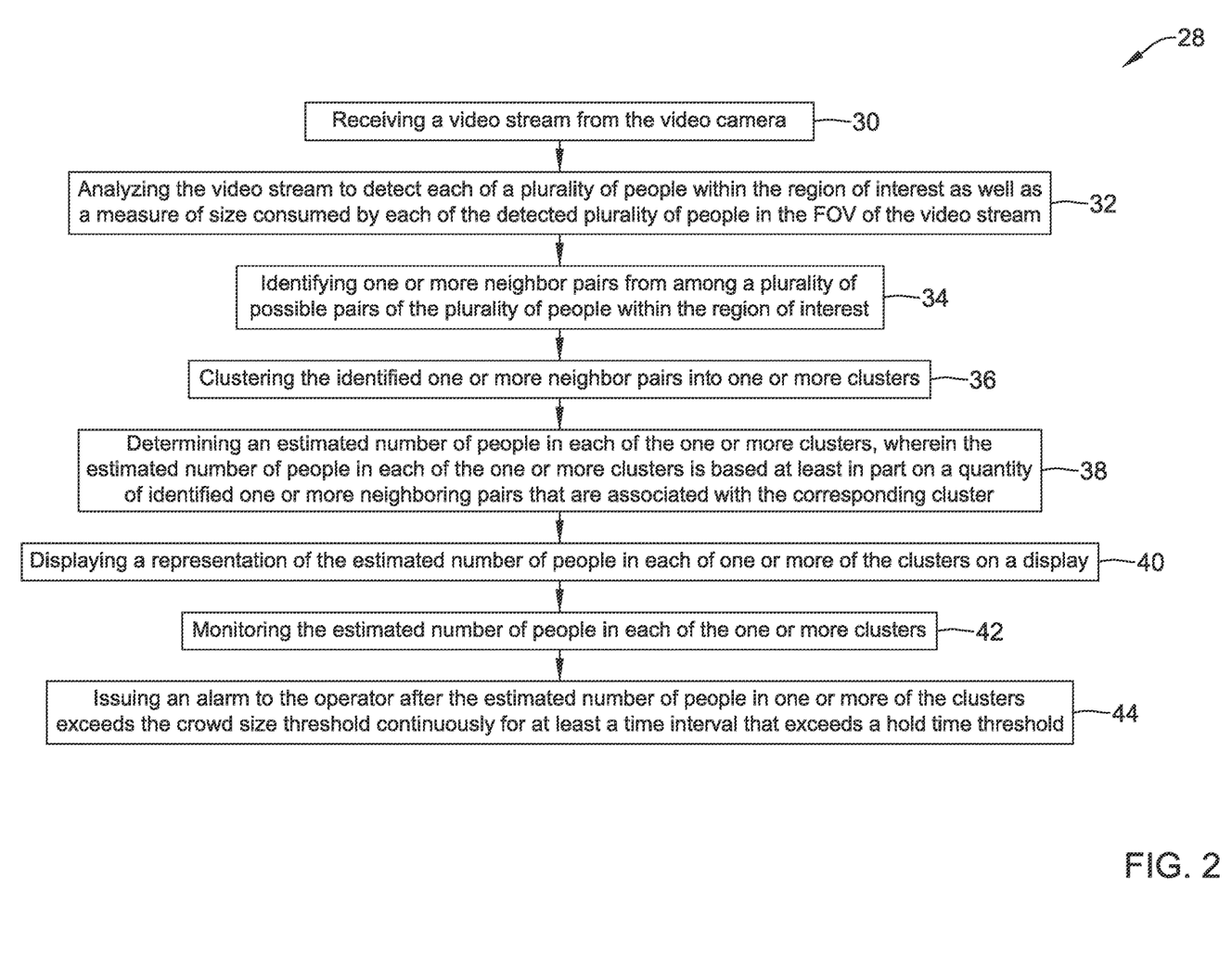
FIG. 2 is a flow diagram showing an illustrative method that may be carried out via the illustrative video surveillance system of FIG. 1.

FIG. 2 is a flow diagram showing an illustrative method 28 of using a computing device (such as the computing device 16, cloud-based server 26 and/or one or more of the edge devices 24) having one or more processors (such as the processor 22) to estimate a number of people that are currently present in a region of interest. The region of interest is covered by a video camera (such as the video camera 12) having a field of view (FOV) that captures the region of interest. The illustrative method 28 includes receiving a video stream from the video camera, as indicated at block 30. The video stream is analyzed to detect each of a plurality of people within the region of interest as well as a measure of size consumed by each of the detected plurality of people in the FOV of the video stream, as indicated at block 32. The size may be any representation of size of the person in the FOV, such as height of the person, width of the person, height of the head of the person, width of the head of the person, or any other suitable measure of size in the FOV. The measure of size may be expressed in any suitable units, such as number of pixels in the FOV. A person that is closer to the video camera will have a greater size in the FOV of the video stream than a similarly sized person that is far away from the video camera. As such, even without having any real depth of field in the video stream, it can be determined with relatively good accuracy that two people that have very different sizes in the FOV are likely to be not close to one another, and thus should not be marked as neighbor pairs.

One or more neighbor pairs are identified from among the plurality of possible pairs of the plurality of people within the region of interest, as indicated at block 34. An example approach for identify one or more neighbor pairs is shown and described with reference to FIG. 3. The identified one or more neighbor pairs are then clustered into one or more clusters, as indicated at block 36. Any of a variety of different clustering methods or algorithms may be used. As an example, clustering may be performed using a Density-Based Spatial Clustering of Applications with Noise (DBSCAN) algorithm. An estimated number of people in each of the one or more clusters is determined, where in some case, the estimated number of people in each of the one or more clusters is based at least in part on a quantity of the identified one or more neighboring pairs that are associated with the corresponding cluster, as indicated at block 38. A representation of the estimated number of people in each of one or more of the clusters is then displayed on a display, as indicated at block 40.

In some instances, determining the estimated number of people in each of the one or more clusters may be based at least in part on the quantity of the identified neighboring pairs that are associated with the corresponding cluster relative to a number of possible pairs of the people associated with the identified neighboring pairs associated with the corresponding cluster.

In some cases, the method 28 may further include superimposing a representation of each of the one or more clusters on the video stream on the display. The method 28 may further include superimposing the representation of the estimated number of people in each of the one or more clusters on the display.

In some instances, as indicated for example at block 42, the method 28 may further include monitoring the estimated number of people in each of the one or more clusters. An alarm may be issued to an operator when the estimated number of people in one or more of the clusters exceeds a crowd size threshold, sometimes after exceeding the crowd size threshold continuously for at least a time interval that exceeds a hold time threshold, as indicated at block 44. The hold time threshold may be a user-definable parameter, for example. The hold time threshold may be set to be equal to one minute, or five minutes, for example.

Figure 3:
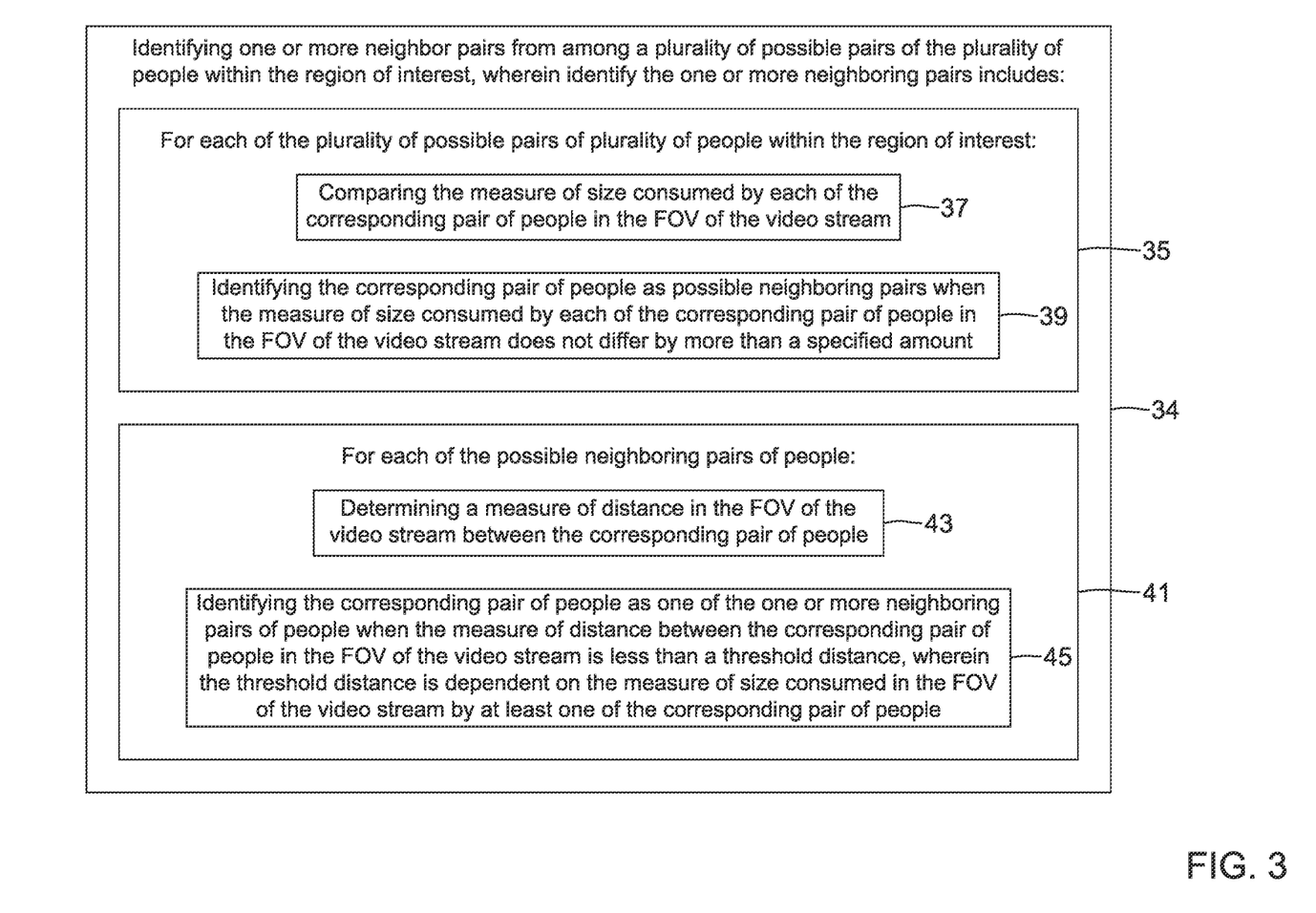
FIG. 3 is a flow diagram showing an illustrative method that may be carried out via the illustrative video surveillance system of FIG. 1.

FIG. 3 is a flow diagram showing an example of identifying neighbor pairs, as referenced at block 34 of FIG. 2. In this example, identifying neighbor pairs includes, for each of the plurality of possible pairs of the plurality of people within the region of interest, several steps, as indicated at block 35. In particular, the measure of size consumed by each of the corresponding pair of people in the FOV is compared, as indicated at block 37. The corresponding pair of people are identified as possible neighbor pairs when the measure of size consumed by each of the corresponding pair of people in the FOV of the video stream does not differ by more than a predetermined amount, as indicated at block 39. In some cases, the measure of size consumed by each of the corresponding pair of people in the FOV of the video stream does not differ by more than a predetermined amount when a ratio (R) of the measure of size consumed by a smaller one of the corresponding pair of people and the measure of size consumed by a larger one of the corresponding pair of people is greater than a threshold ratio. As noted above, a person that is closer to the video camera will have a greater size in the FOV of the video stream than a similarly sized person that is far away from the video camera. As such, even without having any real depth of field in the video stream, it can be determined with relatively good accuracy that two people that have very different sizes in the FOV are likely to be not close to one another, and thus should not be marked as neighbor pairs. By determining a simple ratio (R) of the measure of size consumed by a smaller one of the corresponding pair of people and the measure of size consumed by a larger one of the corresponding pair of people and whether the ratio (R) is greater than a threshold ratio, many possible pairs of people may be easily eliminated from being considered possible neighbor pairs using a simple algorithm that does not consume significant processing resources.

For each of the possible neighboring pairs of people, as indicated at block 41, several steps may be carried out. In the example shown, a measure of distance in the FOV of the video stream between the corresponding pair of people is determined, as indicated at block 43. The corresponding pair of people is identified as one of the one or more neighboring pairs of people when the measure of distance between the corresponding pair of people in the FOV of the video stream is less than a threshold distance, where in some cases, the threshold distance is dependent on the measure of size consumed in the FOV of the video stream by at least one of the corresponding pair of people, as indicated at block 45. In some cases, the threshold distance is dependent on the measure of size consumed in the FOV of the video stream by a smallest of the corresponding pair of people, sometimes factored by a programmable parameter.

A pair of people that are closer to the video camera will have a greater size in the FOV of the video stream than a similarly sized pair of people that are far away from the video camera. As such, the measure of distance in the FOV (e.g. in pixels) between a pair of people that are far from the video camera will represent a greater physical separation between the pair of people than a similar measure of distance in the FOV (e.g. in pixels) between a pair of people that are close to the video camera. As such, providing a threshold distance that is dependent on the measure of size consumed in the FOV of the video stream by at least one of the corresponding pair of people (e.g. smallest person), as indicated at block 45, results in an adaptive threshold that automatically adapts or compensates for the actual physical separation between the pair of people depending on their distance from the video camera.

Figure 4:
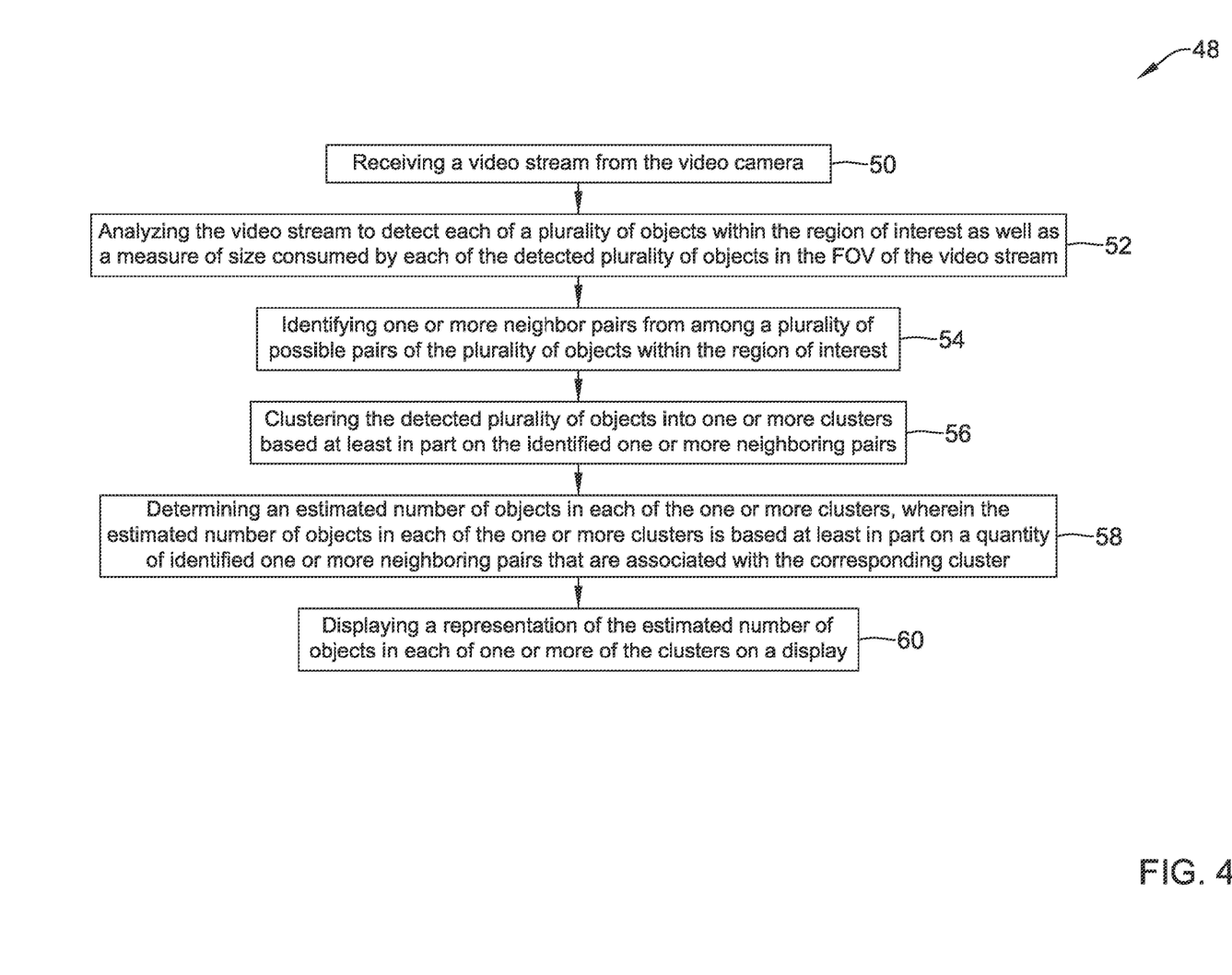
FIG. 4 is a flow diagram showing an illustrative method that may be carried out via the illustrative video surveillance system of FIG. 1.

FIG. 4 is a flow diagram showing an illustrative method 48 of using a computing device (such as the computing device 16, cloud-based server 26 and/or one or more of the edge devices 24) having one or more processors (such as the processor 22) to estimate a number of objects that are currently present in a region of interest. The region of interest is covered by a video camera (such as the video camera 12) having a field of view (FOV) that captures the region of interest. The method 48 includes receiving a video stream from the video camera, as indicated at block 50. The video stream is analyzed to detect each of a plurality of objects within the region of interest as well as a measure of size consumed by each of the detected plurality of objects in the FOV of the video stream, as indicated at block 52. The plurality of objects may include one or more people. The plurality of objects may include any of a variety of inanimate objects, such as boxes, containers and the like. The plurality of objects may include one or more vehicles, for example. In some cases, the plurality of objects may include one or more of people, animals, cars, boats, aircraft, robots and drones, or some combination thereof.

One or more neighbor pairs of objects are identified from among a plurality of possible pairs of the plurality of objects within the region of interest, as indicated at block 54. The detected plurality of objects are clustered into one or more clusters based at least in part on the identified one or more neighboring pairs, as indicated at block 56. In some cases, only the identified neighbor pairs of objects are clustered while those detected objects that are not identified as being part of neighbor pairs are not clustered.

An estimated number of objects in each of the one or more clusters is determined, wherein the estimated number of objects in each of the one or more clusters is based at least in part on a quantity of the identified one or more neighboring pairs of objects that are associated with the corresponding cluster, as indicated at block 58. A representation of the estimated number of objects in each of one or more of the clusters is displayed on a display, as indicated at block 60. In some instances, different colors may be used to indicate clusters having different numbers of objects. As an example, a cluster with relatively fewer objects may be displayed in yellow while a cluster with relatively more objects may be displayed in red. It will be appreciated that any of a variety of different colors could be used. In some cases, particular colors may be used to display clusters of objects that are suspected as being potentially dangerous, for example.

In some cases, identifying the one or more neighboring pairs includes for each of the plurality of possible pairs of the plurality of objects within the region of interest, comparing the measure of size consumed by each of the corresponding pair of objects in the FOV of the video stream and identifying the corresponding pair of objects as possible neighboring pairs when the measure of size consumed by each of the corresponding pair of objects in the FOV of the video stream does not differ by more than a predetermined amount. Identifying the one or more neighboring pairs may include for each one or more pairs of objects, determining a measure of distance in the FOV of the video stream between the corresponding pair of objects, and identifying the corresponding pair of objects as one of the one or more neighboring pairs of objects when the measure of distance between the corresponding pair of objects in the FOV of the video stream is less than a threshold distance, where in some cases the threshold distance is dependent on the measure of size consumed in the FOV of the video stream by at least one of the corresponding pair of objects.

Figure 5:
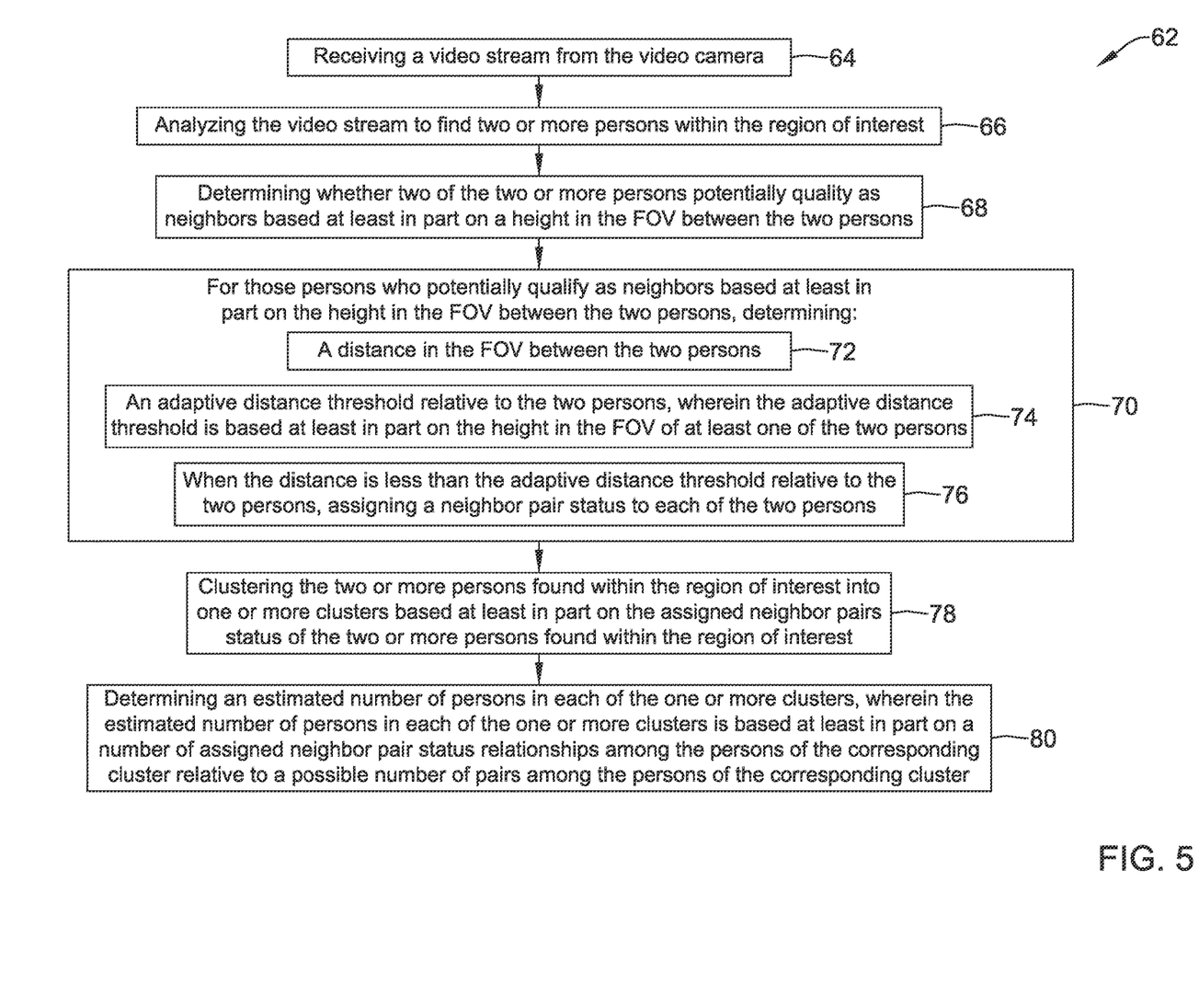
FIG. 5 is a flow diagram showing an illustrative method that may be carried out via the illustrative video surveillance system of FIG. 1.

FIG. 5 is a flow diagram showing an illustrative method 62 of estimating a number of people present in a region of interest, the region of interest covered by a video camera (such as the video camera 12) having a field of view (FOV) that captures the region of interest. The method 62 includes receiving a video stream from the video camera, as indicated at block 64. The video stream is analyzed to find two or more persons within the region of interest, as indicated at block 66. A determination is made as to whether two (e.g. a pair) of the two or more persons potentially qualify as a neighbor pair based at least in part on a height in the FOV between the two persons, as indicated at block 68. For those persons who potentially qualify as neighbors based at least in part on the height in the FOV between the two persons, the method 62 includes determining several things, as indicated at block 70. Block 70 includes determining a distance in the FOV between the two persons, as indicated at block 72. Block 70 includes determining an adaptive distance threshold relative to the two persons, wherein the adaptive distance threshold is based at least in part on the height in the FOV of at least one of the two persons (e.g. smallest person), as indicated at block 74. Block 70 includes determining when the distance is less than the adaptive distance threshold relative to the two persons, and if so, assigning a neighbor pair status to each of the two persons, as indicated at block 76. The persons found within the region of interest are clustered into one or more clusters based at least in part on the assigned neighbor pair status of the two or more persons found within the region of interest, as indicated at block 78. In some cases, only the identified neighbor pairs of people are clustered, while those detected people who are not identified as being part of neighbor pairs are not clustered.

In some cases, the method 62 may further include determining an estimated number of persons in each of the one or more clusters, wherein the estimated number of persons in each of the one or more clusters is based at least in part on a number of assigned neighbor pair status relationships among the persons of the corresponding cluster relative to a possible number of pairs among the persons of the corresponding cluster, as indicated at block 80.

Figure 6:
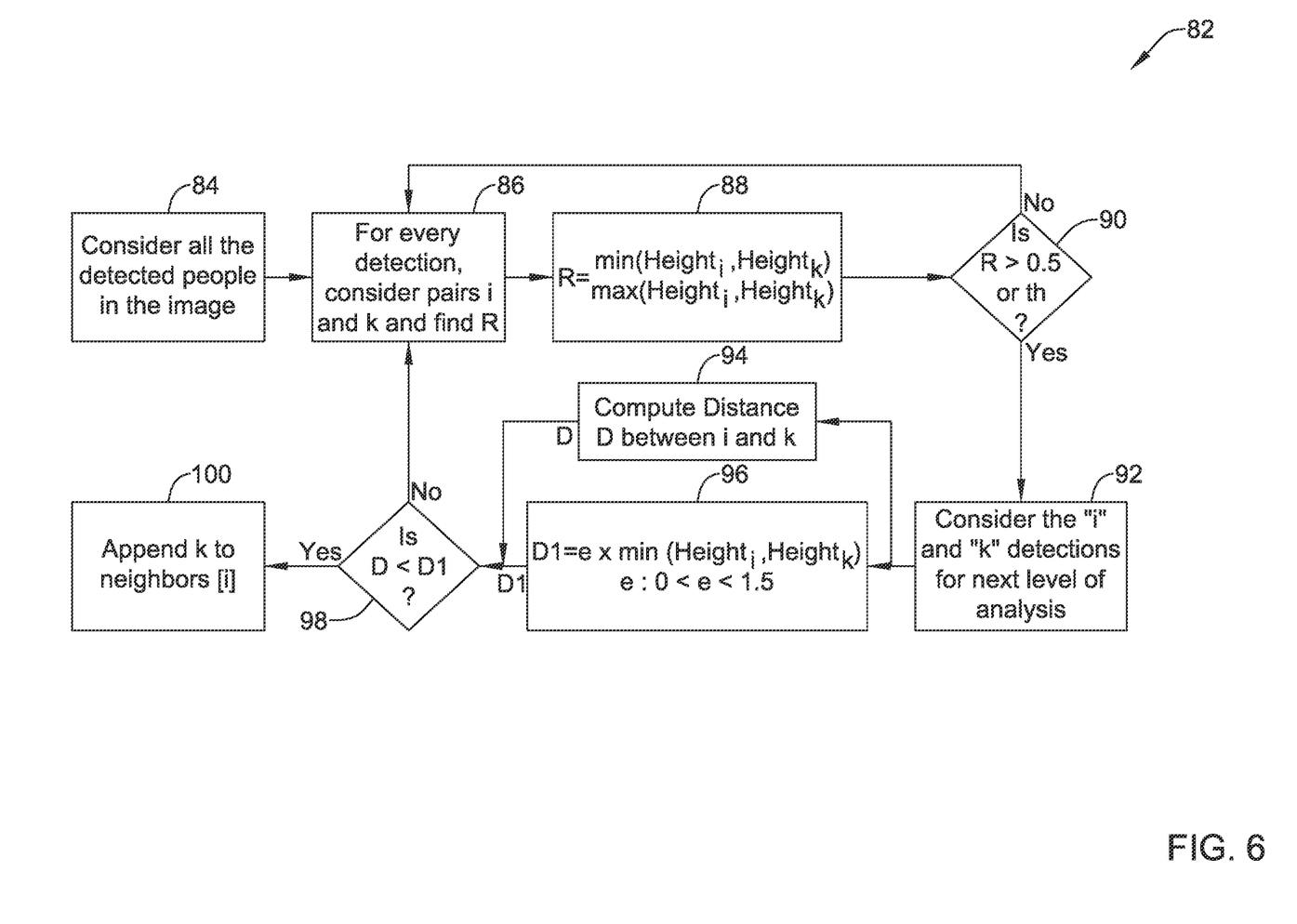
FIG. 6 is a flow diagram showing an example method of determining neighbor pairs.

FIG. 6 is a flow diagram showing an illustrative method 82 of determining which detected people are considered to be neighbor pairs. In some cases, each pair of the detected people (e.g. all possible pairs of people detected in a single frame of a video stream) are considered, as indicated at block 86. A parameter R is calculated at block 88. The parameter R provides a ratio between the height of the shorter of the two people and the height of the taller of the two people of the considered pair. It will be appreciated that differences in distance from the camera are reflected in differences in relative height, particularly in a video image that may be a side or perspective image. At decision block 90, a determination is made as to whether the calculated parameter R is greater than 0.5, or is greater than another threshold. If the calculated parameter R is not greater than 0.5 or another threshold, this means that the two people of the considered pair are likely too far apart (in the depth direction) to be considered neighbors, and control reverts back to block 86, where another pair is considered. By determining the simple ratio (R) and whether the ratio (R) is greater than a threshold ratio, many possible pairs of people may be easily eliminated from being considered possible neighbor pairs using a simple algorithm that does not consume significant processing resources.

If at decision block 90 the answer is yes, and the calculated parameter R is greater than 0.5 or another threshold, this means that the two people are likely close enough together (in the depth direction) to be considered neighbors. In this case, control passes to block 92 for a next level of analysis. A distance D is calculated between the pair of people in the FOV, as indicated at block 94, and a distance threshold D1 is calculated, at indicated at block 96. At decision block 98, a determination is made as to whether D is less than D1. If not, the pair of people are determined to not be neighbors, and control reverts back to block 86, where another pair is considered. However, if the answer is yes, and D is less than D1, control passes to block 100 where the pair is indicated to be neighbors.

D1 represents an adaptive threshold. A pair of people that are closer to the video camera will have a greater size in the FOV of the video stream than a similarly sized pair of people that are far away from the video camera. As such, the measure of distance in the FOV (e.g. in pixels) between a pair of people that are far from the video camera will represent a greater physical separation between the pair of people than a similar measure of distance in the FOV (e.g. in pixels) between a pair of people that are close to the video camera. As such, providing a threshold distance (D1) that is dependent on the measure of size consumed in the FOV of the video stream by at least one of the corresponding pair of people (e.g. smallest person), as indicated at block 46, sometimes factored by a programmable parameter "e", results in an adaptive threshold that automatically adapts or compensates for the actual physical separation between the pair of people depending on their distance from the video camera.

Figure 7:
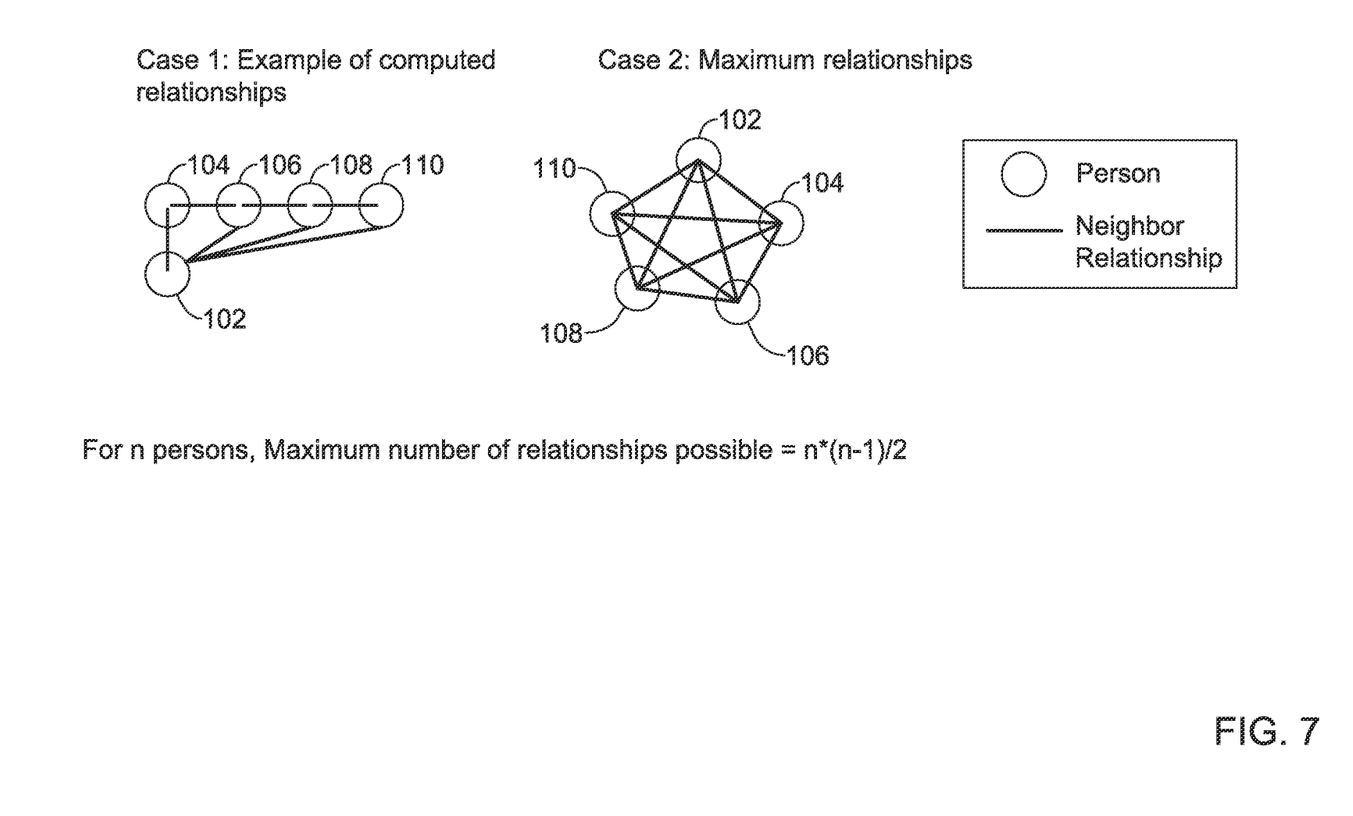
FIG. 7 is a schematic block diagram showing an example of actual neighbor pairs relative to a theoretical maximum number of neighbor pairs.

FIG. 7 provides a graphical representation of a difference between an actual number of relationships (e.g. neighboring pairs) and a theoretical maximum number of relationships. Case 1 shows five objects (could be people, vehicles, etc.) individual labeled as 102, 104, 106, 108 and 110. As seen, objects 102 and 104 may be considered as neighbors. Objects 104 and 106 are neighbors, as are objects 106 and 108, and objects 108 and 110. Object 102 is also a neighbor of object 106, object 108 and object 110. However, objects 104 and 108 are not neighbors. Objects 106 and 110 are not neighbors. This can be contrasted with Case 2, which shows a maximum number of relationships among the people assigned to a cluster. In this case, each object 102, 104, 106, 108, 110 is considered a neighbor of every other object 102, 104, 106, 108, 110 in the cluster. For a total of "n" objects, the theoretical maximum number of relationships (such as being neighbors) can be given by the equation:

$$\text{Maximum relationships} = n * \frac{n-1}{2}.$$

Figure 8:
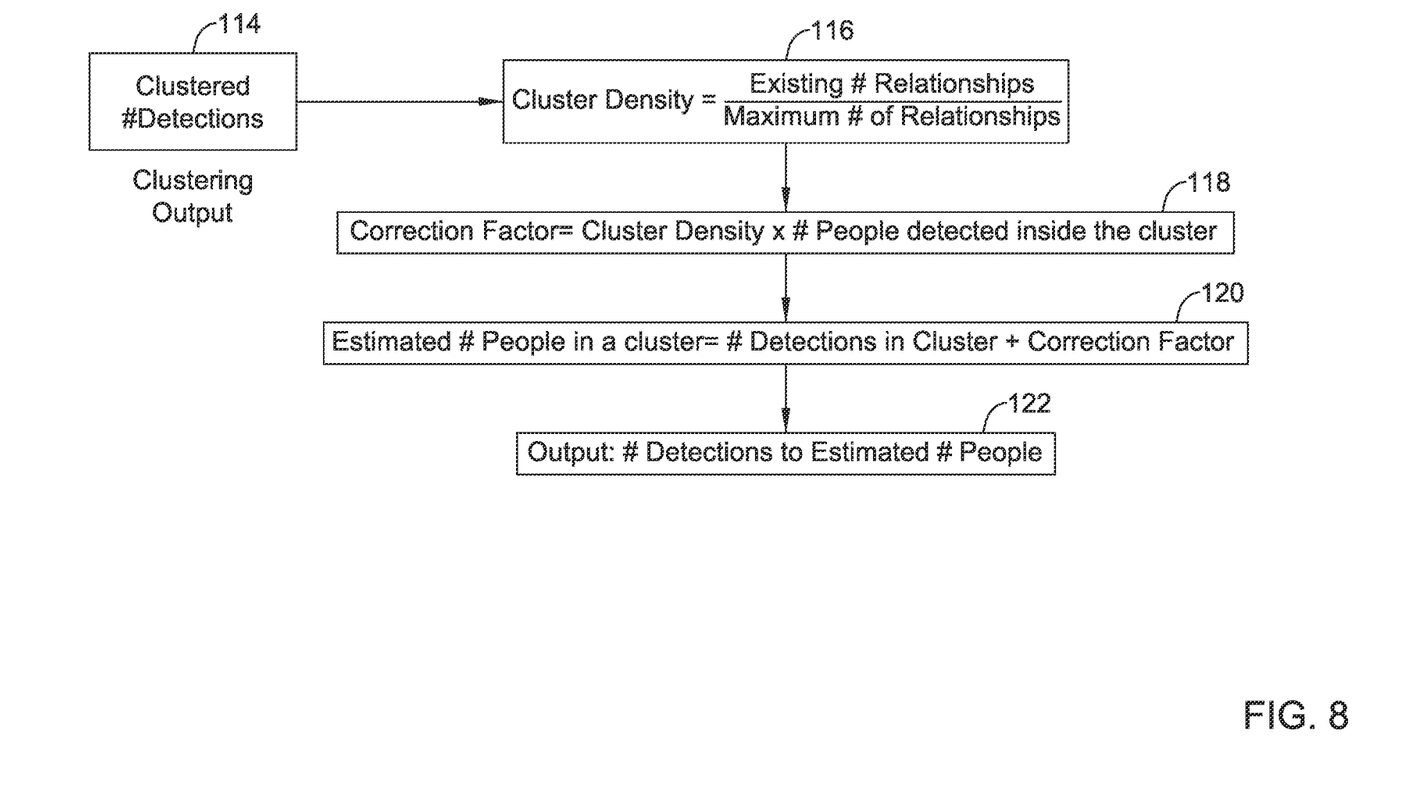
FIG. 8 is a flow diagram showing an example of applying a correction factor to an estimated number of persons in a cluster.

FIG. 8 is a flow diagram showing an illustrative method 112 of calculating a correction factor for correcting the number of people or objects that are in a cluster. In some cases, some of the people that are physically present in the surveillance area may be obstructed from the FOV of the video camera by, for example, other people. This is particularly true when there is a crowd of people gathered in an area. To correct for this, the illustrative method 112 calculates a correction factor for correcting the number of people (or objects) that are in the cluster. The method 112 starts at block 114, which represents the output of a clustering algorithm or method. At block 116, a cluster density is calculated as a ratio of the existing number of relationships (e.g. number of neighboring pairs) and the maximum number of relationships (number of possible pairs of the cluster members), as was illustrated in FIG. 7. At block 118, a correction factor is calculated as the cluster density times the number of people in the cluster. The estimated number of people in a cluster may be calculated as indicated at block 120 as the sum of the number of people in the cluster plus the correction factor. The output, as indicated at block 122, may include a range of people ranging from the number of people reported by the clustering algorithm or method to the corrected number of people.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method of using a computing device having one or more processors to estimate a number of people that are currently present in a region of interest, the region of interest covered by a video camera having a field of view (FOV) that captures the region of interest from a perspective where a person that is closer to the video camera will have a greater size in the FOV than a similarly sized person that is far away from the video camera, the method comprising:
- receiving a video stream from the video camera;
- analyzing the video stream to detect each of a plurality of people within the region of interest as well as a measure of size consumed by each of the detected plurality of people in the FOV of the video stream, wherein the measure of size is used as an indication of a distance that the corresponding one of the detected plurality of people is from the video camera;
- identifying one or more neighbor pairs from among a plurality of possible pairs of the plurality of people within the region of interest, wherein identifying the one or more neighboring pairs includes:
  - for each of the plurality of possible pairs of the plurality of people within the region of interest, comparing the measure of size consumed by each of the corresponding pair of people in the FOV of the video stream and identifying the corresponding pair of people as possible neighboring pairs when the measure of size consumed by each of the corresponding pair of people in the FOV of the video stream does not differ by more than a threshold amount;
  - for each of the possible neighboring pairs of people, determining a measure of distance in the FOV of the video stream between the corresponding pair of people, and identifying the corresponding pair of people as one of the one or more neighboring pairs of people when the measure of distance between the corresponding pair of people in the FOV of the video stream is less than a threshold distance, wherein the threshold distance is dependent on the measure of size consumed in the FOV of the video stream by at least one of the corresponding pair of people;
- clustering the identified one or more neighbor pairs into one or more clusters;
- determining an estimated number of people in each of the one or more clusters, wherein the estimated number of people in each of the one or more clusters is based at least in part on a quantity of the identified one or more neighboring pairs that are associated with the corresponding cluster; and
- displaying a representation of the estimated number of people in each of one or more of the clusters on a display.

2. The method of claim 1, wherein the measure of size consumed by each of the corresponding pair of people in the FOV of the video stream does not differ by more than the threshold amount when a ratio of the measure of size consumed by a smaller one of the corresponding pair of people and the measure of size consumed by a larger one of the corresponding pair of people is greater than a threshold ratio.

3. The method of claim 1, wherein the clustering is performed using a clustering algorithm.

4. The method of claim 1, wherein determining the estimated number of people in each of the one or more clusters is based at least in part on the quantity of the identified neighboring pairs that are associated with the corresponding cluster relative to a number of possible pairs of the people associated with the identified neighboring pairs associated with the corresponding cluster.

5. The method of claim 1, wherein the measure of size consumed by each of the detected plurality of people in the FOV of the video stream corresponds to one or more of a height of each of the detected plurality of people in the FOV of the video stream, a width of each of the detected plurality of people in the FOV of the video stream, and a width of the head of each of the detected plurality of people in the FOV of the video stream.

6. The method of claim 1, wherein the threshold distance is dependent on the measure of size consumed in the FOV of the video stream by a smallest one of the corresponding pair of people.

7. The method of claim 6, wherein the threshold distance is dependent on the measure of size consumed in the FOV of the video stream by the smallest one of the corresponding pair of people factored by a programmable parameter.

8. The method of claim 1, further comprising superimposing a representation of each of the one or more clusters on the video stream on the display.

9. The method of claim 8, further comprising superimposing the representation of the estimated number of people in each of the one or more clusters on the display.

10. The method of claim 1, further comprising:
- issuing an alarm to an operator when the estimated number of people in one or more of the clusters exceeds a crowd size threshold.

11. The method of claim 10, further comprising:
- monitoring the estimated number of people in each of the one or more clusters, and issuing the alarm to the operator after the estimated number of people in one or more of the clusters exceeds the crowd size threshold continuously for at least a time interval that exceeds a hold time threshold.

12. A method of using a computing device having one or more processors to estimate a number of objects that are currently present in a region of interest, the region of interest covered by a video camera having a field of view (FOV) that captures the region of interest from a perspective where an object that is closer to the video camera will have a greater size in the FOV than a similarly sized object that is far away from the video camera, the method comprising:
- receiving a video stream from the video camera;
- analyzing the video stream to detect each of a plurality of objects within the region of interest as well as a measure of size consumed by each of the detected plurality of objects in the FOV of the video stream;
- identifying one or more neighbor pairs of objects from among a plurality of possible pairs of the plurality of objects within the region of interest based at least in part on the measure of size consumed by each of the corresponding pair of objects in the FOV;
- clustering the detected plurality of objects into one or more clusters based at least in part on the identified one or more neighboring pairs;
- determining an estimated number of objects in each of the one or more clusters, wherein the estimated number of objects in each of the one or more clusters is based at least in part on a quantity of the identified one or more neighboring pairs that are associated with the corresponding cluster; and
- displaying a representation of the estimated number of objects in each of one or more of the clusters on a display.

13. The method of claim 12, wherein the plurality of objects comprise one or more people.

14. The method of claim 12, wherein the plurality of objects comprise one or more inanimate objects such as vehicles or boxes.

15. The method of claim 12, wherein the plurality of objects comprise one or more of people, animals, cars, boats, aircraft, robots, and drones.

16. The method of claim 12, wherein identifying the one or more neighboring pairs includes for each of the plurality of possible pairs of the plurality of objects within the region of interest, comparing the measure of size consumed by each of the corresponding pair of objects in the FOV of the video stream and identifying the corresponding pair of objects as possible neighboring pairs when the measure of size consumed by each of the corresponding pair of objects in the FOV of the video stream does not differ by more than a threshold amount.

17. The method of claim 12, wherein identifying the one or more neighboring pairs includes for each one or more pairs of objects, determining a measure of distance in the FOV of the video stream between the corresponding pair of objects, and identifying the corresponding pair of objects as one of the one or more neighboring pairs of objects when the measure of distance between the corresponding pair of objects in the FOV of the video stream is less than a threshold distance, wherein the threshold distance is dependent on the measure of size consumed in the FOV of the video stream by at least one of the corresponding pair of objects.

18. A method of estimating a number of people present in a region of interest, the region of interest covered by a video camera having a field of view (FOV) that captures the region of interest from a perspective where a person that is closer to the video camera will have a greater height in the FOV than a similarly sized person that is far away from the video camera, the method comprising:
  receiving a video stream from the video camera;
  analyzing the video stream to find two or more persons within the region of interest;
  determining whether two of the two or more persons potentially qualify as neighbors based at least in part on a difference in height between the two persons in the FOV;
  for those persons who potentially qualify as neighbors based at least in part on the difference in height between the two persons in the FOV, determining:
    a measure of distance in the FOV between the two persons;
    an adaptive distance threshold that corresponds to the two persons, wherein the adaptive distance threshold is based at least in part on the height in the FOV of at least one of the two persons;
    when the measure of distance between the two persons is less than the adaptive distance threshold that corresponds to the two persons, assigning a neighbor pair status to each of the two persons; and
  clustering the two or more persons found within the region of interest into one or more clusters based at least in part on the assigned neighbor pair status of the two or more persons found within the region of interest.

19. The method of claim 18, further comprising:
  determining an estimated number of persons in each of the one or more clusters, wherein the estimated number of persons in each of the one or more clusters is based at least in part on a number of assigned neighbor pair status relationships among the persons of the corresponding cluster relative to a possible number of pairs among the persons of the corresponding cluster.

20. The method of claim 19, wherein the adaptive distance threshold is based at least in part on the height in the FOV of a shorter one of the two persons.

\* \* \* \* \*